(12) United States Patent
Hata et al.

(10) Patent No.: US 12,423,982 B2
(45) Date of Patent: Sep. 23, 2025

(54) DATA PROCESSING DEVICE, DATA PROCESSING METHOD, AND PROGRAM

(71) Applicant: Sharp NEC Display Solutions, Ltd., Tokyo (JP)

(72) Inventors: Takayuki Hata, Tokyo (JP); Eisaku Ishii, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 741 days.

(21) Appl. No.: 17/550,201

(22) Filed: Dec. 14, 2021

(65) Prior Publication Data
US 2022/0101631 A1    Mar. 31, 2022

Related U.S. Application Data

(63) Continuation of application No. PCT/JP2019/024205, filed on Jun. 19, 2019.

(51) Int. Cl.
*G06V 20/52* (2022.01)
*G06V 20/00* (2022.01)
*G06V 20/40* (2022.01)
*G10L 15/22* (2006.01)

(52) U.S. Cl.
CPC .............. *G06V 20/52* (2022.01); *G06V 20/36* (2022.01); *G06V 20/44* (2022.01); *G06V 20/46* (2022.01); *G10L 15/22* (2013.01)

(58) Field of Classification Search
CPC ........ G06V 20/52; G06V 20/46; G06V 20/36; G06V 20/44; G10L 15/22
See application file for complete search history.

(56) References Cited

U.S. PATENT DOCUMENTS 7,868,912 B2 * 1/2011 Venetianer ....... G08B 13/19667
                                                     348/143
8,307,068 B2 * 11/2012 Schuler ............... G06F 11/3055
                                                     709/224
(Continued)

FOREIGN PATENT DOCUMENTS

JP      H03-245299 A     10/1991
JP      2003-272066 A     9/2003
(Continued)

OTHER PUBLICATIONS

International Search Report (ISR) (PCT Form PCT/ISA/210), in PCT/JP2019/024205, dated Sep. 17, 2019.

*Primary Examiner* — Manav Seth
(74) *Attorney, Agent, or Firm* — McGinn I.P. Law Group, PLLC

(57) ABSTRACT

A data processing device is a device that detects an abnormality in a facility disposed in a room or a sign thereof and includes an acquisition unit and a processing unit. The acquisition unit acquires processing target data. The processing target data is generated by recording an audio or a video inside the room. The processing unit processes a part of the processing target data (hereinafter, referred to as a processing target part) for generating facility information relating to a facility disposed inside the room. Then, the processing unit detects a reference timing that is a timing satisfying a reference condition set in advance and sets the processing target part using the reference timing.

10 Claims, 7 Drawing Sheets

(56) References Cited

U.S. PATENT DOCUMENTS

| | | | | |
|---|---|---|---|---|
| 8,564,661 B2* | 10/2013 | Lipton | ............. | G08B 13/19656 382/103 |
| 8,839,278 B2* | 9/2014 | Wang | ............... | H04N 21/44224 725/16 |
| 8,943,526 B2* | 1/2015 | Rivera | ............... | H04N 21/4532 725/12 |
| 9,411,894 B2* | 8/2016 | Kruglick | ............ | G06Q 30/0255 |
| 11,094,305 B2* | 8/2021 | Tsutaki | ................ | G10H 1/0008 |
| 11,803,346 B2* | 10/2023 | Matsushita | ........... | H04N 7/0127 |
| 11,863,337 B2* | 1/2024 | Tsuruzono | .......... | H04L 12/1822 |
| 2005/0286686 A1* | 12/2005 | Krstulich | ........... | G06Q 30/0205 379/32.04 |
| 2007/0297590 A1* | 12/2007 | Macbeth | ................ | G06Q 10/00 379/201.02 |
| 2008/0109295 A1* | 5/2008 | McConochie | ....... | A61B 5/1172 709/224 |
| 2009/0265462 A1* | 10/2009 | Tajiri | .................. | G06F 11/1443 709/224 |
| 2013/0028489 A1* | 1/2013 | Tracton | .................. | G06V 40/20 382/128 |
| 2013/0305158 A1* | 11/2013 | Vasquez | ............. | H04N 21/4781 715/733 |
| 2014/0368605 A1* | 12/2014 | Liu | ........................ | H04N 7/152 348/14.09 |
| 2018/0150695 A1* | 5/2018 | Guttmann | .............. | G06V 20/40 |
| 2019/0130365 A1* | 5/2019 | Pell | .................... | G06Q 10/1095 |
| 2019/0387061 A1* | 12/2019 | Sato | ........................ | G06V 20/10 |
| 2021/0335332 A1* | 10/2021 | Tsutaki | .................. | G10H 1/125 |
| 2023/0016819 A1* | 1/2023 | Honma | .................... | H04Q 9/00 |
| 2023/0214024 A1* | 7/2023 | Nishimura | .............. | G06F 3/017 348/143 |

FOREIGN PATENT DOCUMENTS

| | | |
|---|---|---|
| JP | 2004-127047 A | 4/2004 |
| JP | 2005-222476 A | 8/2005 |
| JP | 2006-300484 A | 11/2006 |
| JP | 2007-013733 A | 1/2007 |

* cited by examiner

DATA PROCESSING DEVICE, DATA PROCESSING METHOD, AND PROGRAM

TECHNICAL FIELD

The present invention relates to a data processing device, a data processing method, and a program.

BACKGROUND ART

Various facilities are disposed in rooms such as conference rooms. Users of such rooms use the rooms on the premise that there is no abnormality in the indoor facilities. For this reason, in a case in which an abnormality occurs in an indoor facility, it is desirable to detect the abnormality as soon as possible.

In Patent Literature 1, determining abnormalities in environmental facility devices such as an air conditioning facility and the like on the basis of the frequency of reports of requests relating to an environmental facility device is described. In addition, in Patent Literature 2, checking whether a door or a window is open and checking whether there is an abnormality in an indoor fan when an abnormality occurs in environmental adjustment devices such as an air conditioner, a refrigerator, a freezer, a lighting device, and the like is described. In Patent Literature 2, providing a monitoring camera for monitoring the state of a conference room is described.

CITATION LIST

Patent Literature

Patent Literature 1

Japanese Unexamined Patent Application, First Publication No. 2006-300484

Patent Literature 2

Japanese Unexamined Patent Application, First Publication No. 2004-127047

SUMMARY OF INVENTION

Technical Problem

In a case in which an abnormality in a facility or a sign thereof is detected by analyzing audio data acquired by recording audio inside a room and a video acquired by imaging the inside of a room, when a process of detecting an abnormality in a facility or a sign thereof is performed for all the audio data and the video, the load on a processing device is high.

One example of the object of the present invention is to decrease a load of a processing device when an abnormality in a facility or a sign thereof is detected by analyzing a video or audio.

Solution to Issues

According to the present invention, a data processing device includes: an acquisition unit that acquires processing target data generated by recording audio or a video inside a room; and a processing unit that processes a processing target part that is a part of the processing target data for generating facility information relating to facilities disposed inside the room, in which the processing unit detects a reference timing that is a timing satisfying reference conditions set in advance and sets the processing target part using the reference timing.

According to the present invention, a data processing method using a computer, includes: an acquisition step of acquiring processing target data generated by recording an audio or a video inside a room; and a processing step of generating and outputting facility information relating to facilities disposed inside the room by processing a processing target part that is a part of the processing target data, in which, in the processing step, the computer detects a reference timing that is a timing satisfying a reference condition set in advance and sets the processing target part using the reference timing.

According to the present invention, a non-transitory computer readable storage medium that stores a computer readable program that cause, when executed by a computer, the computer to acquire processing target data generated by recording an audio or a video inside a room; and to generate and outputting facility information relating to facilities disposed inside the room by processing a processing target part that is a part of the processing target data, in which, in the processing function, the computer is caused to detect a reference timing that is a timing satisfying a reference condition set in advance and set the processing target part using the reference timing.

Advantageous Effects of Invention

According to the present invention, a load of a processing device decreases when an abnormality in a facility or a sign thereof is detected by analyzing a video or audio.

BRIEF DESCRIPTION OF DRAWINGS

The objects described above, other objects, features, and advantages will become more apparent in accordance with preferred embodiments described below and the following drawings accompanying thereto.

DESCRIPTION OF EMBODIMENTS

Hereinafter, embodiments of the present invention will be described with reference to drawings. In all the drawings, the same reference signs will be assigned to the same constituent elements, and description thereof will be omitted as is appropriate.

First Embodiment

Figure 1:
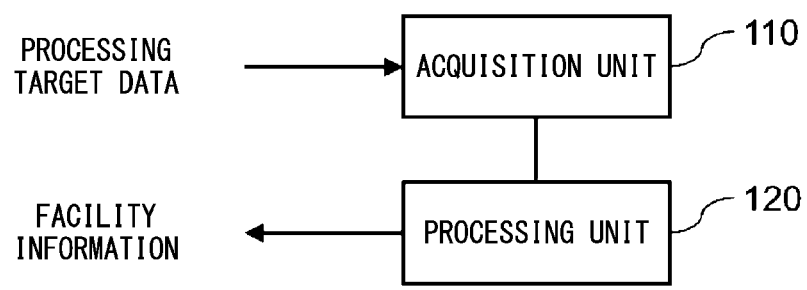
FIG. 1 is a diagram illustrating the functional configuration of a data processing device according to a first embodiment.

FIG. 1 is a diagram illustrating the functional configuration of a data processing device 10 according to this embodiment. The data processing device 10 is a device that detects an abnormality in a facility disposed in a room or a sign thereof and includes an acquisition unit 110 and a processing unit 120. The acquisition unit 110 acquires processing target data. The processing target data is generated by recording an audio or a video for the inside of a room. The processing unit 120 processes a part of processing target data (hereinafter, referred to as a processing target part) for generating facility information relating to facilities inside the room. Then, the processing unit 120 detects a reference timing that is a timing satisfying a reference condition set in advance and sets a processing target part using the reference timing. Hereinafter, the data processing device 10 will be described in detail.

In this embodiment, for example, rooms that are managed by the data processing device 10 are a conference room, a meeting room, a reception room, and the like. The data processing device 10 manages a plurality of rooms. At least one facility is disposed inside each room that is managed by the data processing device 10. For example, this facility is at least one of an air conditioning device such as an air conditioner, a lamp, a computer, an electronic board, a display, a projector, a television conference system, a wiring, a connector, a table, and a chair.

Inside each room managed by the data processing device 10, a data generating device used for generating processing target data is disposed. The data generating device has at least one of an imaging device and a microphone. The data generating device may be a monitoring camera. For example, although the processing target data generated by the data generating device may be video data with an audio, the processing target data may be any one of audio data and video data.

As described above, the acquisition unit 110 acquires processing target data. The acquisition unit 110 may acquire the processing target data from the data generating device or may acquire the processing target data from a storage. In the latter case, the data generating device stores the processing target data in the storage. Then, the acquisition unit 110 acquires the processing target data from this storage.

As described above, the data processing device 10 manages the plurality of rooms. The acquisition unit 110 acquires the processing target data in association with information identifying a room in which the processing target data is generated (hereinafter, referred to as room identification information). For example, the data processing device transmits the processing target data to the acquisition unit 110 or the storage together with room identification information of a room in which the data generating device is installed. In a case in which the processing target data and the room identification information are transmitted to the storage, the storage stores the processing target data in association with the room identification information. Then, the acquisition unit 110 reads the processing target data together with the room identification information associated with the processing target data.

As described above, the processing unit 120 sets a processing target part of the processing target data using a reference timing. Detailed examples of a method for detecting a reference timing and a method for setting a processing target part using the processing unit 120 will be described below.

As described above, the processing unit 120 processes the processing target part for generating facility information. For example, the facility information indicates that an abnormality has occurred in the facility inside the room or that an abnormality will be generated in the future. For example, in a case in which the processing target data includes a video, in order to generate facility information, the processing unit 120 detects movement of a person by processing the video. For example, the processing unit 120 performs a process of detecting each part of a person (for example, a face or a hand) for a frame image constituting a video and identifies a position of the detected part for each frame, thereby detecting movement of the person. In a case in which the processing target data includes an audio, in order to generate facility information, the processing unit 120 detects a voiceprint or a spoken word. Details of a process for generating facility information using the processing unit 120 will be described below with reference to a flowchart.

For example, the facility information generated by the processing unit 120 is transmitted to a terminal of a manager of a room together with the room identification information of the room. Here, the facility information may be stored in a storage device in association with the room identification information. In such a case, the manager of the room reads the facility information and the room identification information from the storage device at a desired timing.

Figure 2:
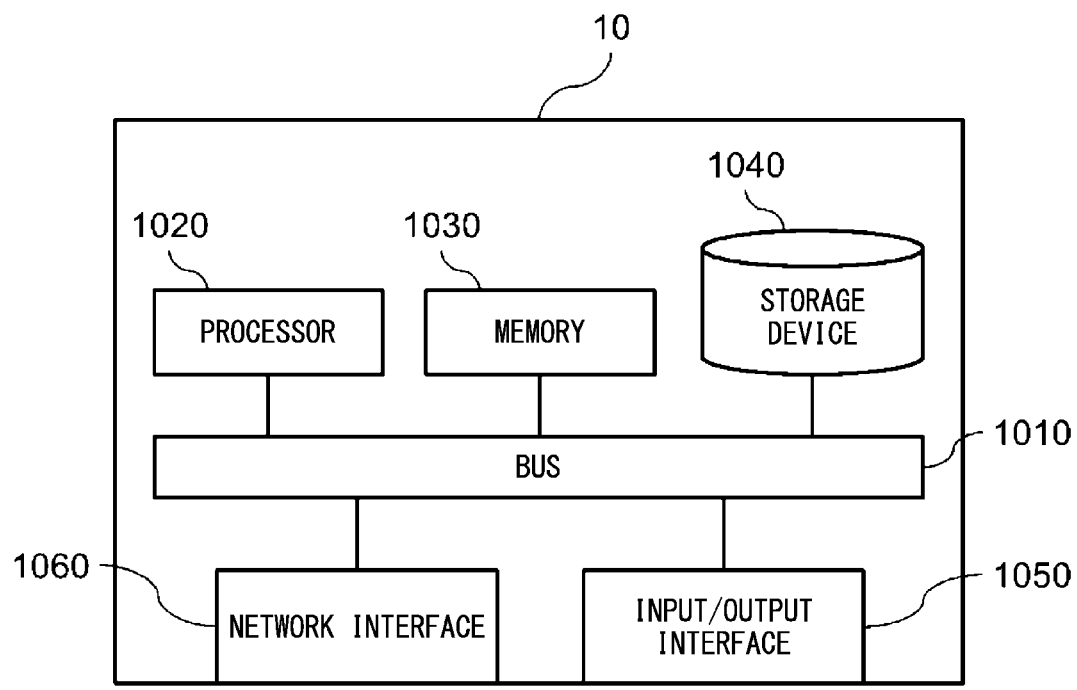
FIG. 2 is a diagram illustrating an example of the hardware configuration of a data processing device.

FIG. 2 is a diagram illustrating an example of the hardware configuration of the data processing device 10. The data processing device 10 includes a bus 1010, a processor 1020, a memory 1030, a storage device 1040, an input/output interface 1050, and a network interface 1060.

The bus 1010 is a data transmission line that is used by the processor 1020, for transmission and reception of data between the memory 1030, the storage device 1040, the input/output interface 1050, and the network interface 1060. Here, a method of connecting the processor 1020 and the like is not limited to bus connection.

The processor 1020 is a processor that is realized by a central processing unit (CPU), a graphics processing unit (GPU), or the like.

The memory 1030 is a main memory device that is realized by a random access memory (RAM) or the like.

The storage device 1040 is an auxiliary storage device that is realized by a hard disk drive (HDD), a solid state drive (SSD), a memory card, a read only memory (ROM), or the like. The storage device 1040 stores a program module that realizes each function of the data processing device 10 (for example, the acquisition unit 110 and the processing unit 120). By the processor 1020 reading such a program module on the memory 1030 and executing the program module, each function corresponding to the program module is realized.

The input/output interface 1050 is an interface that is used for connecting the data processing device 10 and various input/output devices.

The network interface 1060 is an interface that is used for connecting the data processing device 10 to a network. For example, this network is a local area network (LAN) or a wide area network (WAN). A method of connecting the network interface 1060 to the network may be either wireless connection or wired connection. The data processing device 10 is connected to an external device or a storage through the network interface 1060.

Figure 3:
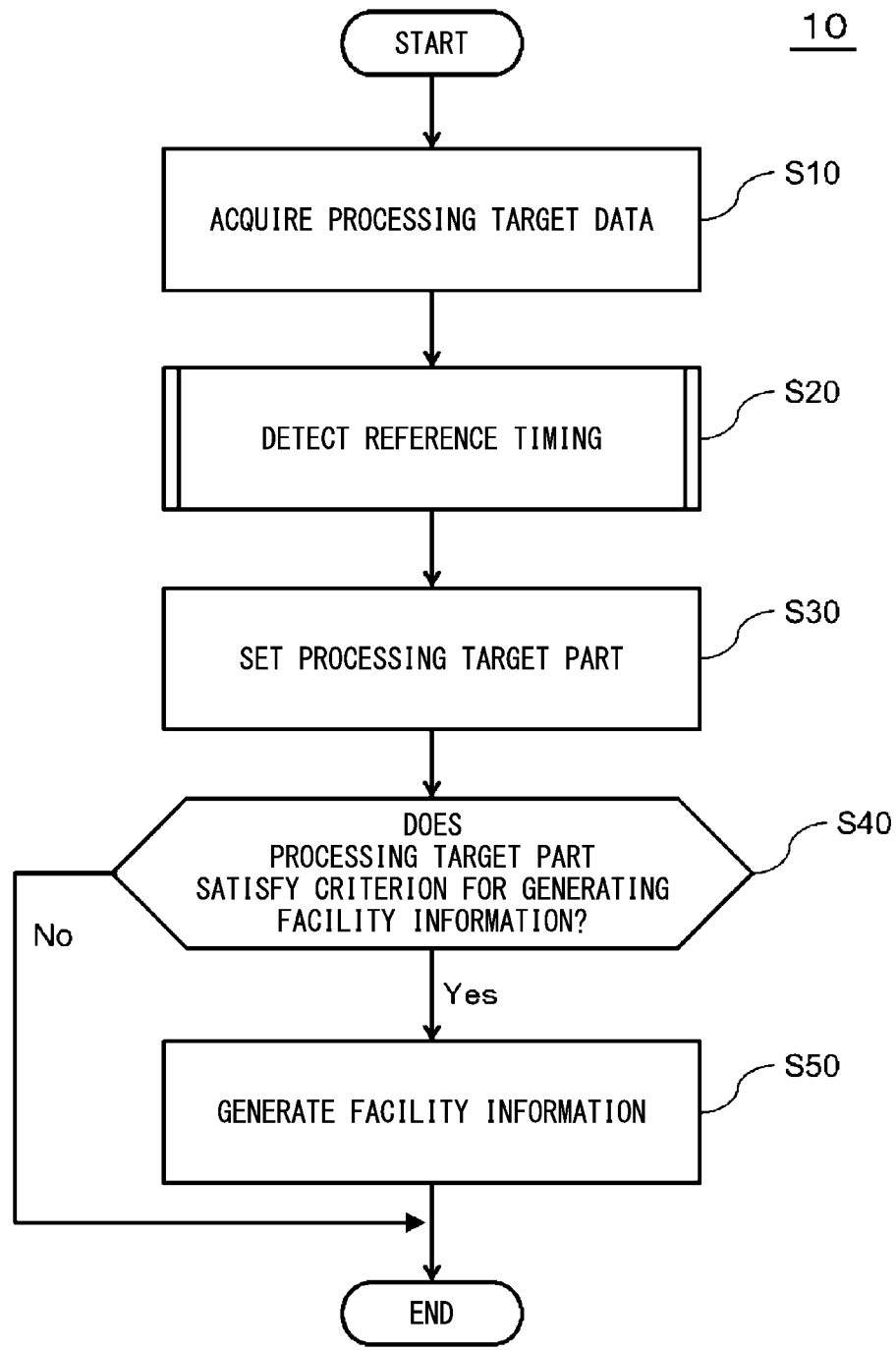
FIG. 3 is a flowchart illustrating an example of a process performed by a data processing device.

FIG. 3 is a flowchart illustrating an example of a process performed by the data processing device 10. First, the acquisition unit 110 of the data processing device 10 acquires processing target data (Step S10). Then, the processing unit 120 performs a process of detecting a reference timing (Step S20). For example, by processing processing target data, the processing unit 120 detects the reference timing. For example, the reference timing represents a timing at which a conference, a preliminary meeting, or a meeting starts. A specific example of Step S20 will be described below.

Next, the processing unit 120 sets a processing target part using the reference timing detected in Step S20 (Step S30).

For example, in a case in which the processing target data is stored in a storage or the like, the processing unit 120 sets a processing target part using any one of the following three methods.

(1) The processing unit 120 sets a period having a predetermined time before the reference timing as a start point and having the reference timing as an end point as a target part.

(2) The processing unit 120 sets a period having the reference timing as a start point and a predetermined time after the reference timing as an end point as a processing target part.

(3) The processing unit 120 sets a period having a first predetermined time before the reference timing as a start point and a second predetermined time after the reference timing as an end point as a processing target part. Here, the first predetermined time and the second predetermined time may be the same time or may be different from each other.

In a case in which the acquisition unit 110 acquires processing target data from the data generating device, in other words, in a case in which the data processing device 10 immediately processes the processing target data, the processing unit 120 sets a processing target part, for example, using the method (2) described above. In addition, in a case in which the data processing device 10 has a function of storing processing target data for a constant time, even when the acquisition unit 110 acquires the processing target data from the data generating device, the processing unit 120 can use all the methods (1) to (3) described above.

Then, the processing unit 120 processes the processing target part and determines whether or not a criterion for generating facility information is satisfied (Step S40). In a case in which the facility information indicates that an abnormality has occurred in the facility or that there is a sign thereof, for example, the criterion for generating facility information is one of the following (A) and (B).

(A) Movement of a person located in the vicinity of the facility is detected by processing a video included in the processing target part. Such movement of a person satisfying the criterion is set as at least a part of necessary conditions for generating facility information. For example, the criterion used here is the following (a) and (b).

(a) A reference number of persons or more (for example, two or more) have gathered in the vicinity of the facility.

(b) Persons located in the vicinity of the facility are changed a reference number of times (for example, twice) or more within a reference time.

(B) Words spoken by a person are detected by processing an audio included in the processing target part. Then, movement of a person located in the vicinity of the facility is detected. Detection of a keyword (a second keyword) set in advance for a predetermined number of times is set as at least a part of necessary conditions for generating facility information. In a case in which a plurality of types of facilities are disposed inside a room, the second keyword may be set for each facility.

In addition, in a case in which log data indicating an operation of a facility is able to be acquired, the processing unit 120 may set log data of a time frame corresponding to the processing target part satisfying a criterion as at least a part of necessary conditions for generating facility information. In such a case, the processing unit 120 acquires log data, for example, through a communication network. For example, the criteria for generating facility information are as follows.

(i) When a power button is operated a reference number of times (for example, twice) or more within a predetermined time.

(ii) When a connector has been plugged in and removed a reference number of times (for example, twice) or more within a predetermined time.

(iii) When the same operation is performed a reference number of times (for example, twice) or more within a predetermined time.

In addition, the facility information may mean the facility being difficult to use instead of an abnormality in the facility or a sign thereof. In such a case, a second keyword different from that of an abnormality in the facility or a sign thereof may be set.

Thereafter, the processing unit 120 processes the processing target part and determines whether or not the processing target part satisfies the criterion for generating facility information. In a case in which the criterion is satisfied (Step S40: Yes), the processing unit 120 generates facility information and outputs the generated facility information (Step S50).

In addition, the processing unit 120 may similarly process processing target data of a part other than the processing target part and determine whether or not the part satisfies the criterion for generating facility information. In such a case, for example, the processing unit 120 generates a value indicating a processing result (for example, "1" when the criterion is satisfied, and "0" otherwise) for each of the processing target part and the part other than the processing target part and generates and outputs facility information when a sum value of the values satisfies a criterion. At this time, the processing unit 120 may set a weight of the processing target part to be relatively large. For example, the processing unit 120 may set a value acquired when the processing target part satisfies the criterion to be larger than a value acquired when the part other than the processing target part satisfies the criterion.

Figure 4:
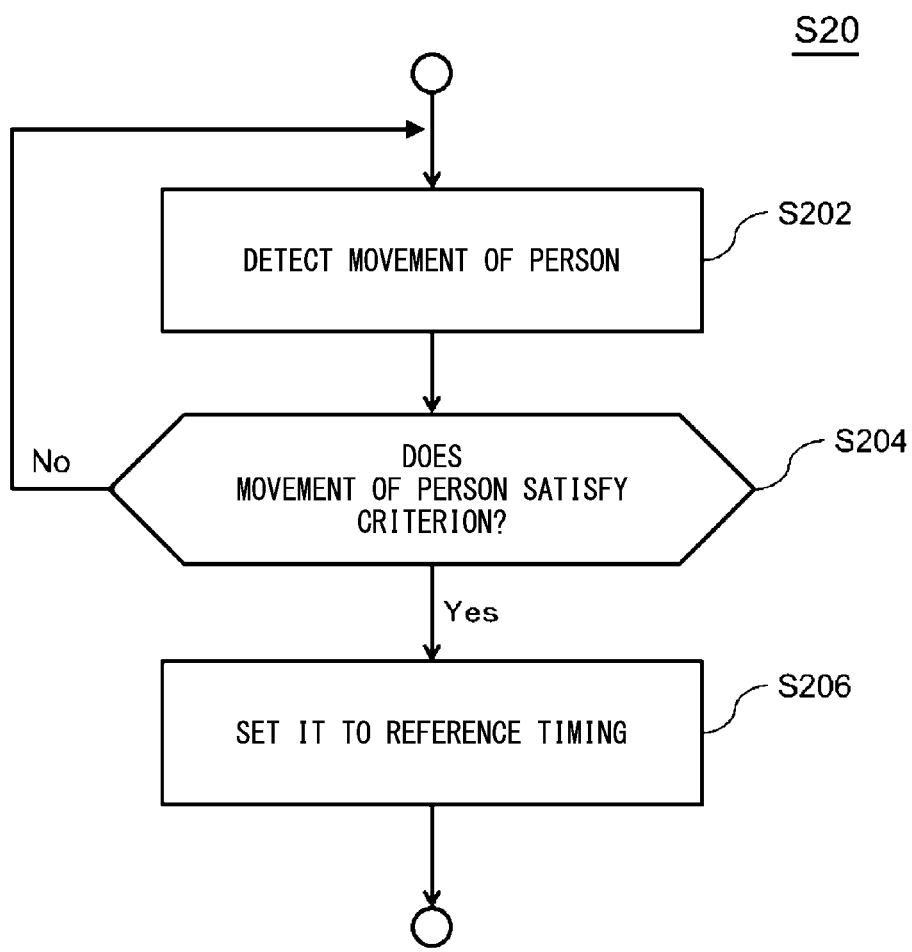
FIG. 4 is a flowchart illustrating a first example of Step S20 illustrated in FIG. 3.

FIG. 4 is a flowchart illustrating a first example of Step S20 illustrated in FIG. 3. In the example illustrated in this drawing, the processing unit 120 processes a video acquired by imaging the inside of a room. First, the processing unit 120 detects at least one of movement and a sight line of a person located in the vicinity of the facility (Step S202). When the motion or the sight line of the person satisfies a criterion (Step S204: Yes), it is set as a reference timing (Step S206). Examples of the criterion used here is as follows.

When a person present inside a room is detected

When a distance between a person and the facility becomes equal to or smaller than a reference value When a person is in contact with the facility When a person is in contact with a controller of the facility When a person standing inside the room disappears When the amount of movement of a person inside the room becomes equal to or smaller than a criterion When a sight line of a person inside the room is directed toward a display In addition, the criteria described above may be some of necessary conditions for a reference timing, in other words, some of reference conditions.

Figure 5:
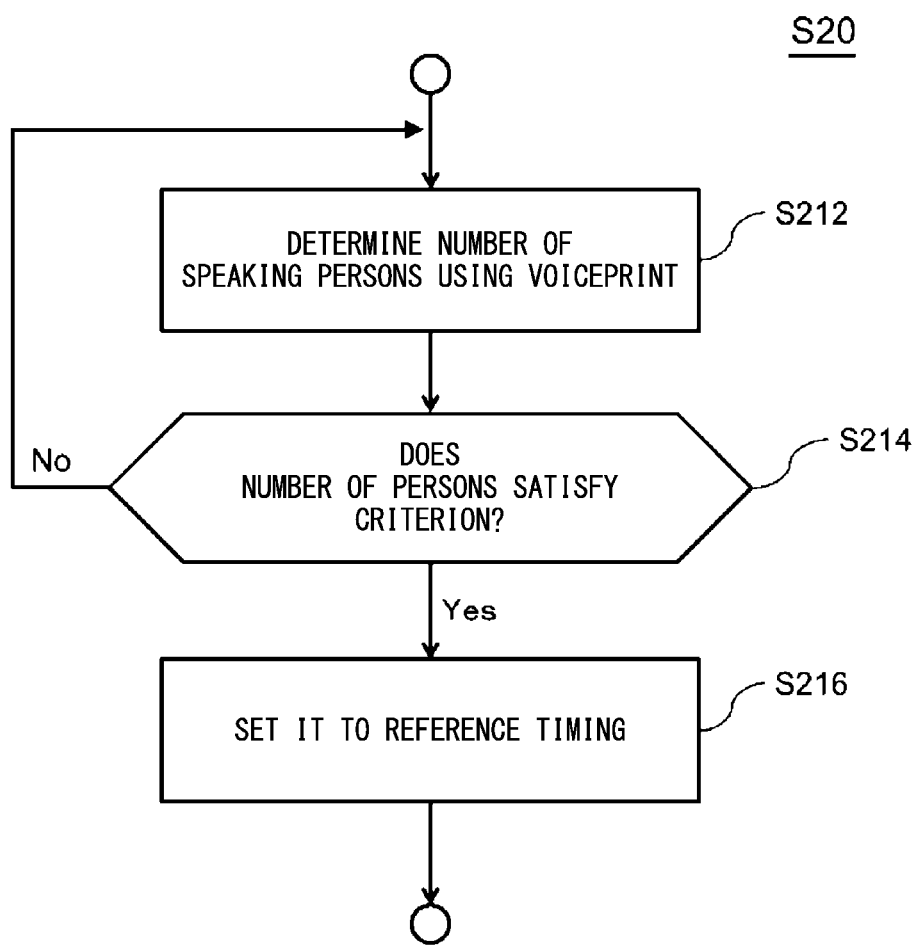
FIG. 5 is a flowchart illustrating a second example of Step S20 illustrated in FIG. 3.

FIG. 5 is a flowchart illustrating a second example of Step S20 illustrated in FIG. 3. In the example illustrated in this drawing, the processing unit 120 processes an audio inside of a room. First, the processing unit 120 performs a process of detecting a voiceprint for a person's sound included in the audio and determines the number of persons who are speaking per unit time (for example, a time equal to or longer than 10 seconds and equal to or shorter than one minute) (Step S212). Then, when the number of detected persons satisfies a criterion, for example, when the number of detected persons becomes equal to or smaller than a number set in advance (one person) (Step S214: Yes), it is set as a reference timing (Step S216). In Step S214, the number of persons satisfying the criterion may be a part of necessary conditions for the reference timing.

Figure 6:
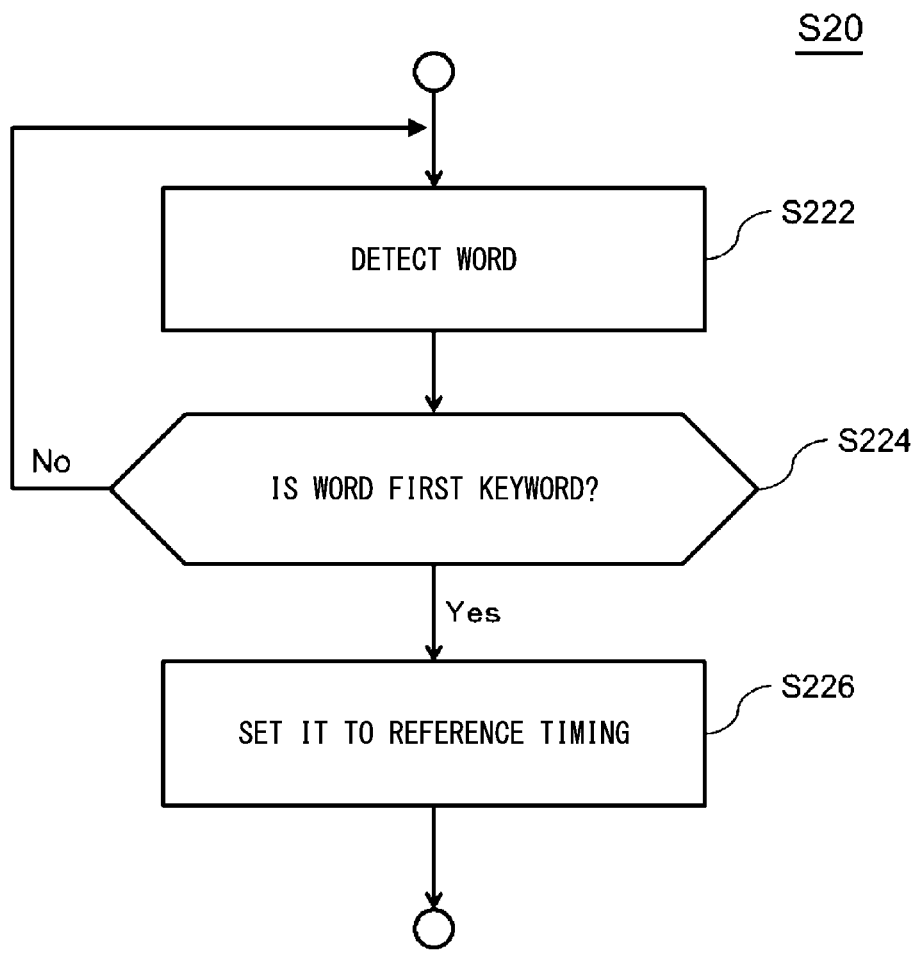
FIG. 6 is a flowchart illustrating a third example of Step S20 illustrated in FIG. 3.

FIG. 6 is a flowchart illustrating a third example of Step S20 illustrated in FIG. 3. Also in the example illustrated in the drawing, the processing unit 120 processes an audio inside of a room. First, the processing unit 120 detects words included in the audio (Step S222). Then, when a detected word is at least one keyword (first keyword) set in advance (Step S224: Yes), the reference timing is set (Step S226). In addition, in Step S224, detection of a first keyword a plurality of number of times (not necessarily the same first keyword) may be set as a condition for setting the reference timing. The detection of a first keyword may be a part of necessary conditions for the reference timing.

As above, according to this embodiment, the data processing device 10 generates facility information relating to an abnormality in a facility or a sign thereof by processing data (processing target data) acquired by recording a video or an audio inside a room. Here, the processing unit 120 of the data processing device 10 selects a part (a processing target part) of the processing target data as a processing target. For this reason, an audio or a video after the processing target part may not be processed for generating facility information. Therefore, the amount of calculation of the data processing device 10 decreases.

Second Embodiment

Figure 7:
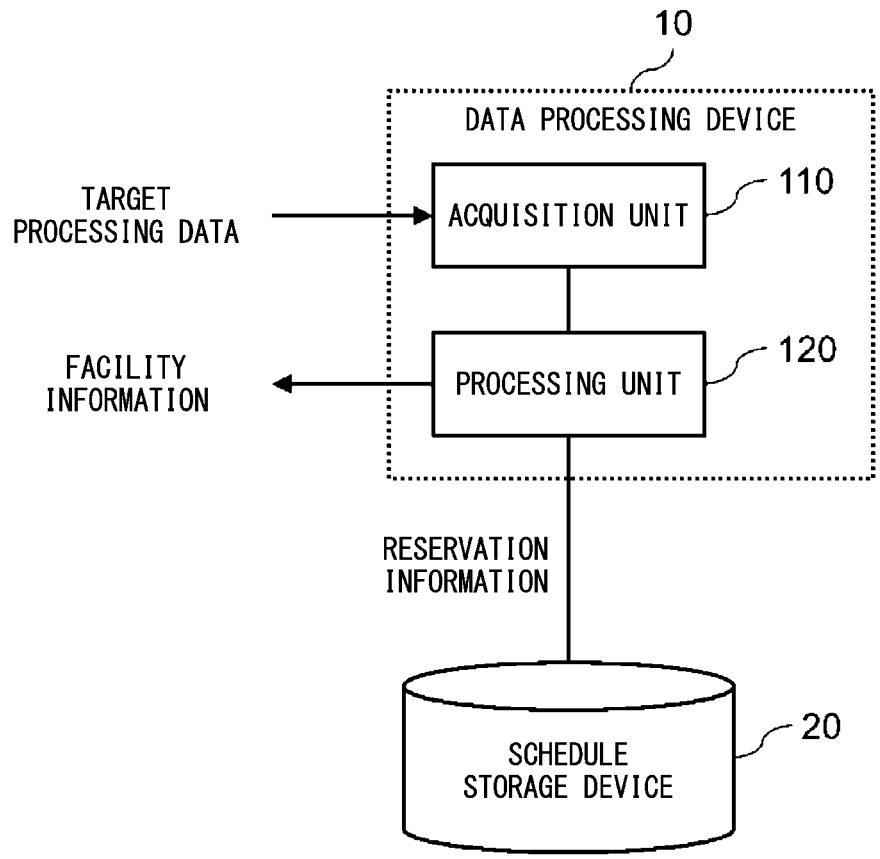
FIG. 7 is a diagram illustrating the functional configuration of a data processing device according to a second embodiment.

FIG. 7 is a diagram illustrating the functional configuration of a data processing device 10 according to this embodiment. The data processing device 10 according to this embodiment has a configuration similar to the data processing device 10 according to the first embodiment except that the processing unit 120 acquires reservation information of each room and uses this reservation information for setting a reference timing In the example illustrated in this drawing, reservation information is stored in a schedule storage device 20. The reservation information includes room identification information and a scheduled use start time and a scheduled use end time of a room corresponding to the room identification information. For this reason, the processing unit 120 can acquire a scheduled use start time of the room by using the reservation information.

More specifically, the processing unit 120 acquires room identification information of a target room and reads a scheduled use start time corresponding to this room identification information from the schedule storage device 20. Then, the reference timing is set using this room identification information. For example, the processing unit 120 sets elapse of the reference time from the scheduled use start time as at least a part of necessary conditions for the reference timing. Here, the processing unit 120 may set a time after elapse of the reference time from the scheduled use start time as the reference timing.

Also according to this embodiment, similar to the first embodiment, the amount of calculation of the data processing device 10 decreases. In addition, processing target data does not need to be processed when the process of setting the reference timing is performed, in other words, when a processing target part is set, and thus the amount of calculation of the data processing device 10 can be further decreased.

Third Embodiment

Figure 8:
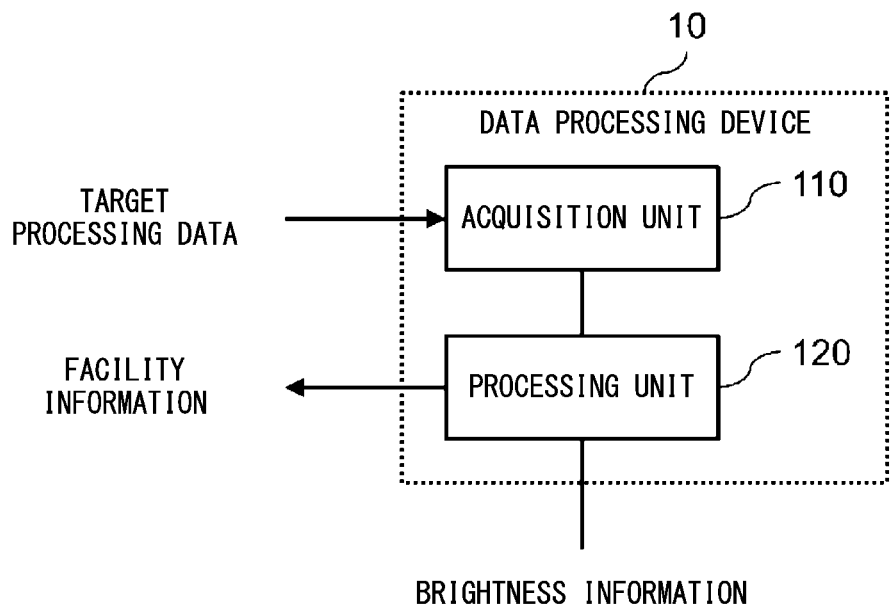
FIG. 8 is a diagram illustrating the functional configuration of a data processing device according to a third embodiment.

FIG. 8 is a diagram illustrating the functional configuration of a data processing device 10 according to this embodiment. The data processing device 10 according to this embodiment has a configuration similar to the data processing device 10 according to the first embodiment except that brightness information is used for setting a processing target part.

A processing unit 120 of the data processing device 10 acquires brightness information. The brightness information is information that can be used for identifying brightness of the inside of a room. For example, the brightness information may be generated using an illumination sensor disposed inside of the room or may be information that represents on/off of a switch of a lamp disposed inside the room.

Figure 9:
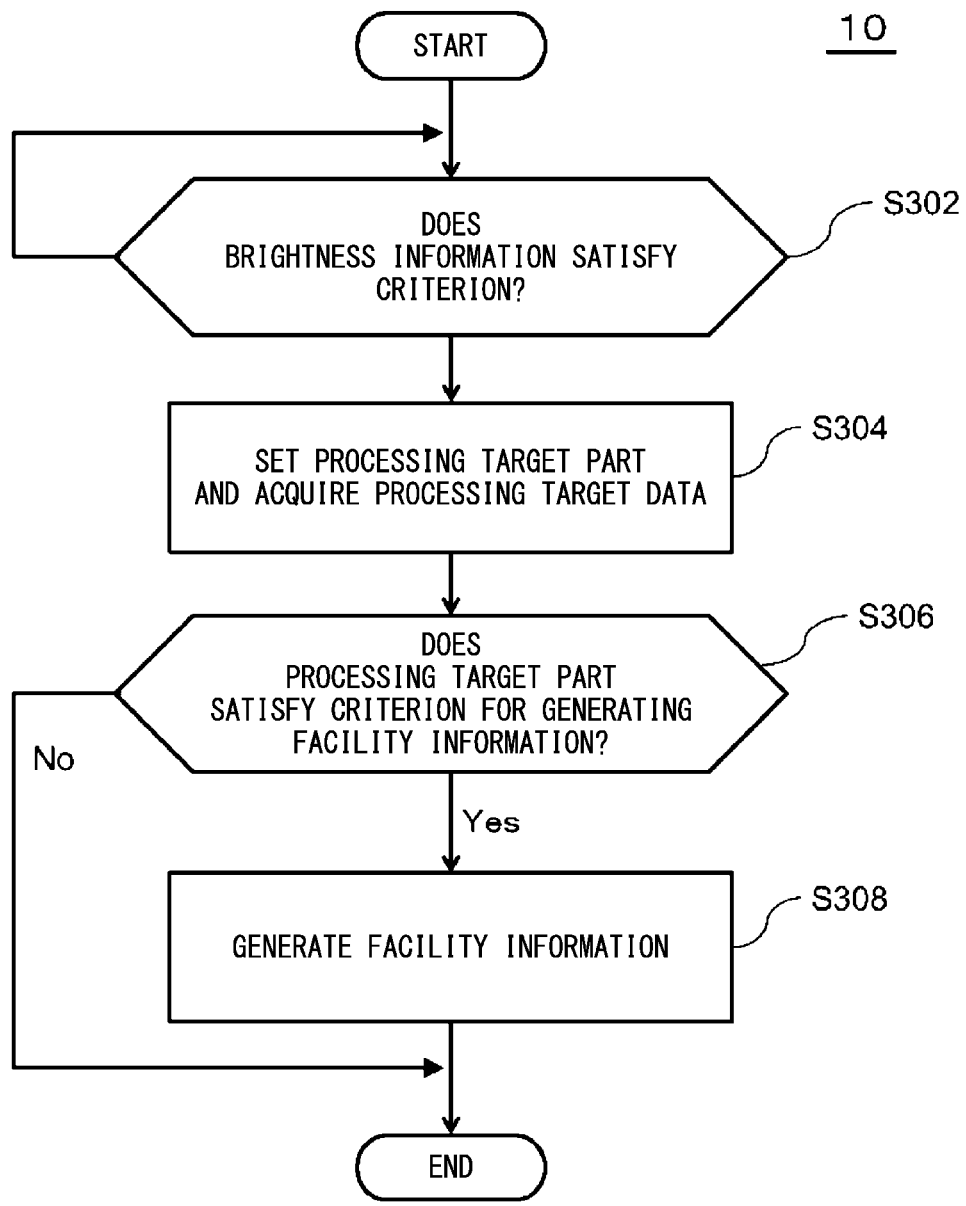
FIG. 9 is a flowchart illustrating an example of a process performed by the data processing device according to the third embodiment.

FIG. 9 is a flowchart illustrating an example of a process performed by the data processing device 10 according to this embodiment. In the example illustrated in this drawing, the data processing device 10 generates facility information during use of a room.

First, the processing unit 120 continuously acquires brightness information. Then, when the brightness information satisfies a criterion (Step S302: Yes), an acquisition unit 110 is caused to start to acquire processing target data. At this time, the acquisition unit 110 also designates a timing at which acquisition of the processing target data ends. In other words, the acquisition unit 110 acquires only a processing target part of the processing target data (Step S304).

A criterion used in Step S302, for example, is as follows, and it unit that the brightness inside a room is estimated or identified as being equal to or smaller than a reference value.

(a) When the brightness information is generated using an illuminance sensor disposed inside the room, the brightness of the inside is equal to or smaller than a reference value.

(b) When the brightness information indicates on/off of a lamp disposed inside of the room, a lamp set in advance is off.

Processes (Step S306 and Step S308) performed thereafter are as described using Step S40 and Step S50 according to the first embodiment.

In Step S20 illustrated in FIG. 3 according to the first embodiment, the brightness information according to this embodiment satisfying the criterion described above may be set as at least a part of necessary conditions for the reference timing.

Also according to this embodiment, similar to the first embodiment, the amount of calculation of the data processing device 10 decreases.

As above, although the embodiments of the present invention have been described with reference to the drawings, these are examples of the present invention, and various configurations other than those described above may be employed.

In a plurality of the flowcharts used for the description presented above, although a plurality of steps (processes) are sequentially described, the execution order of the steps executed in each of the embodiments is not limited to the described order. In each of the embodiments, the order of the steps illustrated in the drawing may be changed in a range in which there is no problem in contents thereof. In addition, the embodiments described above may be combined in a range in which contents are contradictory to each other.

Some or all of the embodiments described above may be described as the following supplementary notes but are not limited thereto.

In some embodiments, a data processing device includes an acquisition unit that acquires processing target data generated by recording an audio or a video inside a room and a processing unit that processes a processing target part that is a part of the processing target data for generating facility information relating to facilities disposed inside the room, in which the processing unit detects a reference timing that is a timing satisfying a reference condition set in advance and sets the processing target part using the reference timing.

In some cases, the processing target data includes video data, and the processing unit detects movement of a person present inside the room by processing the video data and sets the movement of the person satisfying a reference as at least a part of the reference condition.

In some cases, the processing unit sets a distance between the person and the facility being equal to or smaller than a reference value as at least a part of the reference condition.

In some cases, the processing unit sets the person being in contact with the facility as at least a part of the reference condition.

In some cases, the processing unit sets the person being in contact with a controller of the facility as at least a part of the reference condition.

In some cases, the processing unit sets disappearance of a person standing inside of the room as at least a part of the reference condition.

In some cases, the processing unit sets a timing at which brightness of the inside of the room is estimated or identified as being equal to or smaller than a reference value as at least a part of the reference condition.

In some cases, the processing target data includes audio data, and the processing unit analyzes the audio data and sets the number of speaking persons within a unit time being equal to or smaller than a reference number as at least a part of the reference condition.

In some cases, the processing target data includes audio data, and the processing unit sets detection of a first keyword set in advance from the audio data as at least a part of the reference condition.

In some cases, the processing unit acquires a scheduled use start time of the room from reservation information of the room and sets the reference timing using the scheduled use start time.

In some cases, the processing unit sets elapse of a reference time from the scheduled use start time as at least a part of the reference condition.

In some cases, the processing target data includes a video, the facility information indicates that an abnormality in the facility has occurred or there is a sign of the abnormality, and the processing unit detects movement of a person located in the vicinity of the facility by processing the video and sets the movement satisfying a reference as at least a part of the necessary condition for generating the facility information.

In some cases, the processing target data includes audio data, the facility information indicates that an abnormality has occurred in the facility or there is a sign of the abnormality, and the processing unit sets detection of a second keyword set in advance a predetermined number of times from the audio data as at least a part of the necessary condition for generating the facility information.

In some cases, the processing unit acquires log data indicating an operation of the facility in a time frame corresponding to the processing target part and further sets the log data satisfying a reference as at least a part of the necessary condition for generating the facility information.

In some embodiments, a data processing method using a computer, including an acquisition step of acquiring processing target data generated by recording an audio or a video inside a room and a processing step of generating and outputting facility information relating to facilities disposed inside the room by processing a processing target part that is a part of the processing target data in which, in the processing step, the computer detects a reference timing that is a timing satisfying a reference condition set in advance and sets the processing target part using the reference timing.

In some cases, the processing target data includes video data, and the computer detects movement of a person present inside the room by processing the video data and sets the movement of the person satisfying a reference as at least a part of the reference condition.

In some cases, the computer sets a distance between the person and the facility being equal to or smaller than a reference value as at least a part of the reference condition.

In some cases, the computer sets the person being in contact with the facility as at least a part of the reference condition.

In some cases, the computer sets the person being in contact with a controller of the facility as at least a part of the reference condition.

In some cases, the computer sets disappearance of a person standing inside of the room as at least a part of the reference condition.

In some cases, the computer sets a timing at which brightness of the inside of the room is estimated or identified as being equal to or smaller than a reference value as at least a part of the reference condition.

In some cases, the processing target data includes audio data, and the computer analyzes the audio data and sets the number of speaking persons within a unit time being equal to or smaller than a reference number as at least a part of the reference condition.

In some cases, the processing target data includes audio data, and the computer sets detection of a first keyword set in advance from the audio data as at least a part of the reference condition.

In some cases, the computer acquires a scheduled use start time of the room from reservation information of the room and sets the reference timing using the scheduled use start time.

In some cases, the computer sets elapse of a reference time from the scheduled use start time as at least a part of the reference condition.

In some cases, the processing target data includes a video, the facility information indicates that an abnormality in the facility has occurred or there is a sign of the abnormality, and the computer detects movement of a person located in the vicinity of the facility by processing the video and sets the movement satisfying a reference as at least a part of the necessary condition for generating the facility information.

In some cases, the processing target data includes audio data, the facility information indicates that an abnormality has occurred in the facility or there is a sign of the abnormality, and the computer sets detection of a second keyword set in advance a predetermined number of times from the audio data as at least a part of the necessary condition for generating the facility information.

In some cases, the computer acquires log data indicating an operation of the facility in a time frame corresponding to the processing target part and further sets the log data satisfying a reference as at least a part of the necessary condition for generating the facility information.

In some embodiments, a non-transitory computer readable storage medium that stores a computer readable program that cause, when executed by a computer, the computer to acquire processing target data generated by recording an audio or a video inside a room and to generate and outputting facility information relating to facilities disposed inside the room by processing a processing target part that is a part of the processing target data in which, in the processing function, the computer is caused to detect a reference timing that is a timing satisfying a reference condition set in advance and set the processing target part using the reference timing.

In some cases, the processing target data includes video data, and the computer is caused to detect movement of a person present inside the room by processing the video data and set the movement of the person satisfying a reference as at least a part of the reference condition.

In some cases, a distance between the person and the facility being equal to or smaller than a reference value is set as at least a part of the reference condition.

In some cases, the person being in contact with the facility is set as at least a part of the reference condition.

In some cases, the person being in contact with a controller of the facility is set as at least a part of the reference condition.

In some cases, disappearance of a person standing inside of the room is set as at least a part of the reference condition.

In some cases, a timing at which brightness of the inside of the room is estimated or identified as being equal to or smaller than a reference value is set as at least a part of the reference condition.

In some cases, the processing target data includes audio data, the audio data is analyzed, and the number of speaking persons within a unit time being equal to or smaller than a reference number is set as at least a part of the reference condition.

In some cases, the processing target data includes audio data, and detection of a first keyword set in advance from the audio data is set as at least a part of the reference condition.

In some cases, the computer is caused to acquire a scheduled use start time of the room from reservation information of the room and set the reference timing using the scheduled use start time.

In some cases, elapse of a reference time from the scheduled use start time is set as at least a part of the reference condition.

In some cases, the processing target data includes a video, the facility information indicates that an abnormality in the facility has occurred or there is a sign of the abnormality, and the computer is caused to detect movement of a person located in the vicinity of the facility by processing the video and set the movement satisfying a reference as at least a part of the necessary condition for generating the facility information.

In some cases, the processing target data includes audio data, the facility information indicates that an abnormality has occurred in the facility or there is a sign of the abnormality, and the computer is caused to set detection of a second keyword set in advance a predetermined number of times from the audio data as at least a part of the necessary condition for generating the facility information.

In some cases, the computer acquires log data indicating an operation of the facility in a time frame corresponding to the processing target part and further sets the log data satisfying a reference as at least a part of the necessary condition for generating the facility information.

What is claimed is:

1. A data processing device comprising:
a memory that stores a sets of processor-executable instructions; and
a hardware processor device configured to execute the sets of processor-executable instructions to cause the hardware processor device to perform operations comprising:
acquiring processing target data generated by a data generating device comprising at least one of an imaging device, and a monitoring camera, wherein the target data comprises video data that is generated by the data generating device from a video inside a room;
processing a processing target part that is a part of the processing target data for generating facility information relating to facilities disposed inside the room;
detecting a reference timing that is a timing satisfying a reference condition set in advance; and
setting the processing target part using the reference timing, by performing one of:
setting a period having a predetermined time before the reference timing as a start point and having the reference timing as an end point as a target part;
setting a period having a first predetermined time before the reference timing as a start point and a second predetermined time after the reference timing as an end point as a processing target part,
wherein the processing target data includes video data, and
wherein the hardware processor device is caused to perform further operations comprising:
detecting movement of a person present inside the room by processing the video data and sets the movement of the person satisfying a reference as at least a part of the reference conditions.

2. The data processing device according to claim 1, wherein the hardware processor device is caused to perform further operations comprising:
setting a distance between the person and the facility being equal to or smaller than a reference value as at least a part of the reference condition.

3. The data processing device according to claim 1, wherein the hardware processor device is caused to perform further operations comprising
setting the person being in contact with the facility as at least a part of the reference condition.

4. The data processing device according to claim 1, wherein the hardware processor device is caused to perform further operations comprising
setting the person being in contact with a controller of the facility as at least a part of the reference condition.

5. The data processing device according to claim 1, wherein the hardware processor device is caused to perform further operations comprising
setting disappearance of a person standing inside of the room as at least a part of the reference condition.

6. The data processing device according to claim 1, wherein the hardware processor device is caused to perform further operations comprising
setting a timing at which a brightness of the inside of the room is estimated or identified as being equal to or smaller than a reference value as at least a part of the reference condition.

7. A data processing device comprising:
a memory that stores a sets of processor-executable instructions; and
a hardware processor device configured to execute the sets of processor-executable instructions to cause the hardware processor device to perform operations comprising:
acquiring processing target data generated by a data generating device comprising at least one of an imaging device, a monitoring camera, and a microphone, wherein the target data comprises at least one of audio data and video data that is generated by the data generating device from an audio or a video inside a room;
processing a processing target part that is a part of the processing target data for generating facility information relating to facilities disposed inside the room;
detecting a reference timing that is a timing satisfying a reference condition set in advance; and setting the processing target part using the reference timing,
wherein acquiring processing target data comprises acquiring a scheduled use start time of the room from reservation information of the room and
wherein setting the processing target part comprises setting the reference timing using the scheduled use start time,
wherein the processing target data includes video data, and
wherein the hardware processor device is caused to perform further operations comprising: detecting movement of a person present inside the room by processing the video data and sets the movement of the person satisfying a reference as at least a part of the reference conditions.

8. The data processing device according to claim 7, wherein setting the processing target part comprises setting elapse of a reference time from the scheduled use start time as at least a part of the reference condition.

9. A data processing device comprising:
a memory that stores a sets of processor-executable instructions; and
a hardware processor device configured to execute the sets of processor-executable instructions to cause the hardware processor device to perform operations comprising:
acquiring processing target data generated by a data generating device comprising at least one of an imaging device, a monitoring camera, and a microphone, wherein the target data comprises at least one of audio data and video data that is generated by the data generating device from an audio or a video inside a room;
processing a processing target part that is a part of the processing target data for generating facility information relating to facilities disposed inside the room;
detecting a reference timing that is a timing satisfying a reference condition set in advance;
setting the processing target part using the reference timing,
wherein the processing target data includes a video,
wherein the facility information indicates that an abnormality in the facility has occurred or there is a sign of the abnormality, and
wherein the hardware processor device is caused to perform further operations comprising:
detecting movement of a person located in the vicinity of the facility by processing the video; and
setting the movement satisfying a reference as at least a part of the necessary condition for generating the facility information.

10. The data processing device according to claim 9, wherein the hardware processor device is caused to perform further operations comprising:
acquiring log data indicating an operation of the facility in a time frame corresponding to the processing target part and further sets the log data satisfying a reference as at least a part of the necessary condition for generating the facility information.

* * * * *